(12) United States Patent
Meredith et al.

(10) Patent No.: US 7,980,163 B2
(45) Date of Patent: Jul. 19, 2011

(54) AIR DEFLECTOR ASSEMBLIES FOR MITER SAWS

(75) Inventors: Daryl S. Meredith, York, PA (US); Kevin S. Agan, Fallston, MD (US); Joseph D. Anderson, York, PA (US)

(73) Assignee: Black & Decker Inc., Newark, DE (US)

( * ) Notice: Subject to any disclaimer, the term of this patent is extended or adjusted under 35 U.S.C. 154(b) by 251 days.

(21) Appl. No.: 12/123,555

(22) Filed: May 20, 2008

(65) Prior Publication Data

US 2009/0288533 A1 Nov. 26, 2009

(51) Int. Cl.
*B23D 47/00* (2006.01)
(52) U.S. Cl. .......................................... 83/478; 30/390
(58) Field of Classification Search .................... 83/478, 83/100; 30/390, 391; 451/455
See application file for complete search history.

(56) References Cited

U.S. PATENT DOCUMENTS

| | | | |
|---|---|---|---|
| 2,984,268 A | | 5/1961 | Vuichard |
| 3,797,354 A | | 3/1974 | Allison |
| 4,774,866 A | | 10/1988 | Dehari et al. |
| 5,033,192 A | * | 7/1991 | Franz et al. ................. 30/124 |
| 5,046,255 A | * | 9/1991 | Lebreux .......................... 30/390 |
| 5,074,179 A | | 12/1991 | Omi |
| 5,370,025 A | | 12/1994 | Itzov |
| 5,537,748 A | * | 7/1996 | Takahashi et al. ............ 30/124 |
| 5,675,895 A | * | 10/1997 | Mori et al. ................... 30/124 |
| 5,873,169 A | * | 2/1999 | James et al. ................. 30/391 |
| 5,974,927 A | | 11/1999 | Tsune |
| 6,155,246 A | * | 12/2000 | Yamami et al. ............. 125/13.01 |
| 6,510,772 B2 | | 1/2003 | Brickner, Jr. et al. |
| 6,742,425 B2 | | 6/2004 | Oktavec et al. |
| 6,971,297 B1 | * | 12/2005 | Meredith et al. ................. 83/478 |
| 7,069,831 B2 | | 7/2006 | Chang |
| 7,222,560 B2 | | 5/2007 | Parks et al. |
| 7,241,211 B2 | * | 7/2007 | Baratta ......................... 451/455 |

(Continued)

FOREIGN PATENT DOCUMENTS

| | | |
|---|---|---|
| DE | 2312686 | 9/1974 |
| DE | 2917497 | 11/1980 |

(Continued)

OTHER PUBLICATIONS

European Search Report for application No. EP 09 16 0456, dated Sep. 15, 2009.

*Primary Examiner* — Kenneth E. Peterson
(74) *Attorney, Agent, or Firm* — Adan Ayala

(57) ABSTRACT

A saw includes a rotatable cutting blade having a first side, a second side, an outer edge and a front end region, a motor for driving the cutting blade, and a blade guard covering at least a portion of the blade. The saw has an air deflector assembly positioned in proximity to the front edge region of the cutting blade, the air deflector assembly having a first deflector device positioned substantially adjacent to, but spaced apart from, the first side of the rotatable cutting blade, and a second deflector device. The second deflector device is movable between an operating position whereby the second deflector device is positioned substantially adjacent to, but spaced apart from, the second side of the blade, and a non-operating position wherein the second deflector device is spaced apart from the blade by a greater distance than in the operating position.

16 Claims, 9 Drawing Sheets

U.S. PATENT DOCUMENTS

| | | |
|---|---|---|
| 7,308,844 B2 | 12/2007 | Sheddy et al. |
| 7,380,343 B2 * | 6/2008 | Yoshimura et al. ............ 30/388 |
| 2004/0103769 A1 | 6/2004 | Parks et al. |
| 2005/0229757 A1 | 10/2005 | Parks et al. |
| 2007/0245871 A1 * | 10/2007 | Li .................................. 83/478 |

FOREIGN PATENT DOCUMENTS

| | | |
|---|---|---|
| DE | 3819291 | 12/1989 |
| EP | 0016688 | 10/1980 |
| GB | 371666 | 4/1932 |
| GB | 375468 | 6/1932 |

* cited by examiner

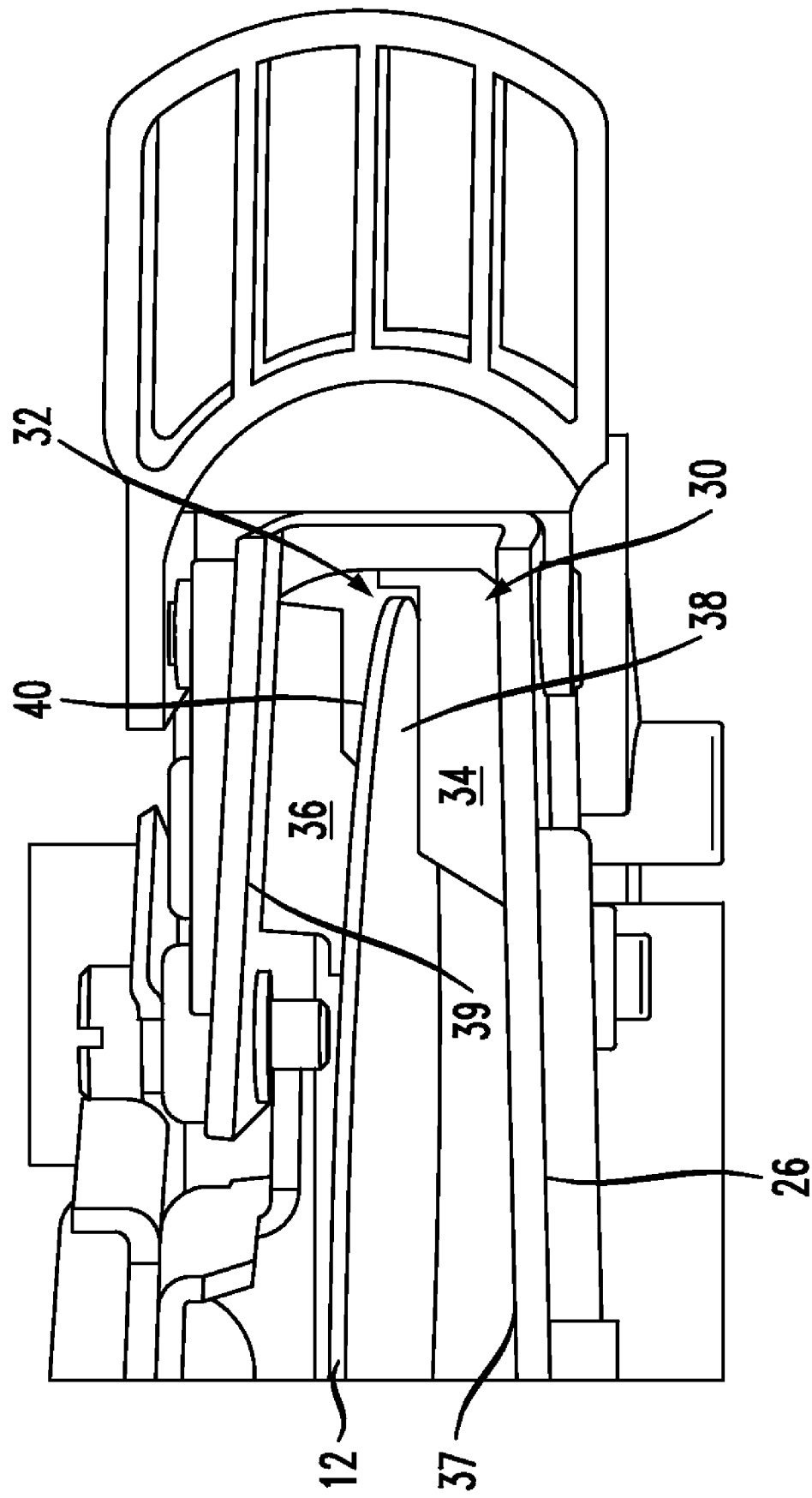

AIR DEFLECTOR ASSEMBLIES FOR MITER SAWS

BACKGROUND

1. Field

The present invention relates generally to power saws, and more specifically to minimizing dust dispersion in power saws having rotating cutting blades.

2. Description of Related Art

During various construction, manufacturing and assembly operations, pieces of material such as wood, plastic and metal (i.e. work pieces) must be cut to exact lengths, shapes and dimensions. In many instances, power equipment such as miter saws are used to accomplish these tasks. During cutting operations, a user is typically positioned in front of the saw. Miter saws typically have both a fixed blade guard and a movable blade guard. The fixed blade guard remains fixed relative to the rotating cutting blade and serves to cover an upper portion of the blade during cutting operations. When the user is standing in the front of the miter saw, the blade rotates toward the user at the front end of the saw, which generates air flow toward the front end of the saw. This air flow tends to disperse saw dust that has accumulated on top of the table and other surfaces, and directs some of this dust towards the user. Although the movable blade guard shields the user somewhat, the air flow generated by the rotating blade still causes significant dust dispersion.

FIG. 1 shows a prior art miter saw having a fixed blade guard 26' that covers a top side of a rotatable cutting blade 12'. At the front end of the blade guard, the inner walls of the guard are spaced from the cutting blade, which allows air flow to freely exit from the front end of the guard. As noted above, this configuration results in extensive scattering of the dust generated during cutting operations and impedes the efficient collection of saw dust.

There have been a number of efforts directed to improving dust collection and/or limiting scattering of dust. For example, commonly assigned U.S. Pat. No. 7,222,560, the disclosure of which is hereby incorporated by reference herein, discloses a miter saw having a dust collector flap secured to the rear of an upper blade guard. In one embodiment, the flap has at least one slot formed therein so that the flap may conform to or easily pass over an obstruction (e.g. a work piece) that engages the dust collector flap.

In spite of the above advances, there remains a need for improved systems, devices and methods for controlling air flow in power saws to thereby reduce dust scattering and/or improve dust collection.

SUMMARY

In one embodiment, the present invention provides a saw including a base, a saw assembly coupled to the base and including a rotatable cutting blade having a first side, a second side, an outer edge and a front end region, a motor for driving the rotatable cutting blade, and a fixed blade guard covering at least a portion of the rotatable cutting blade. The fixed blade guard is substantially fixed in position relative to the rotatable cutting blade. The saw further includes an air deflector assembly positioned in proximity to the front end region of the rotatable cutting blade. The air deflector assembly preferably includes a first deflector device positioned substantially adjacent to, but spaced apart from, the first side of the rotatable cutting blade, and a second deflector device. The first deflector device is fixedly coupled to the fixed blade guard. In one embodiment, the first deflector device may be permanently connected to or integrally formed with the fixed blade guard, and project inwardly toward the cutting blade from a side wall of the fixed blade guard. The second deflector device is coupled to the fixed blade guard, and is desirably movable between an operating position wherein the second deflector device is positioned substantially adjacent to, but spaced apart from, the second side of the rotatable cutting blade, and a non-operating position wherein the second deflector device is spaced apart from the rotatable cutting blade by a greater distance than in the operating position. The air deflector assembly may be positioned at least partially within an interior of the fixed blade guard.

In one embodiment, the first deflector device extends between a location substantially adjacent to a first inner side of the fixed blade guard and a location substantially adjacent to, but spaced apart from, the first side of the rotatable cutting blade. In another embodiment, when in the operating position, the second deflector device extends between a location substantially adjacent to a second inner side of the fixed blade guard and the location substantially adjacent to, but spaced apart from, the second side of the rotatable cutting blade.

The first deflector device may include a main body portion and an extension portion, wherein the extension portion extends from an exterior of the fixed blade guard to the interior of the fixed blade guard. The extension portion of the first deflector device may also extend through a first aperture in the fixed blade guard. In one embodiment, the extension portion may be permanently connected with or integrally formed with the fixed blade guard, and extend inwardly toward the cutting blade from an inner side wall of the fixed blade guard. In these embodiments, the fixed blade guard may not require a first aperture for receiving the extension portion of the first deflector device.

In yet another embodiment, the second deflector device further includes a main body portion and an extension portion extending from an exterior of the fixed blade guard into the interior of the fixed blade guard. The extension portion of the second deflector device may also extend through a second aperture in the fixed blade guard.

In another embodiment, the main body portion of the second deflector device is cantilevered and biased to move the second deflector device away from the second side of the rotatable cutting blade, and includes a projection extending outwardly from a top surface thereof, the projection extending outwardly by an increasing amount along a length thereof. The saw may further include a pivot plate secured to the fixed blade guard and having an underside engagable with the projection of the second deflector device, and movable along the projection between a first position wherein the engagement moves the second deflector device into the operating position, and a second position wherein the engagement is such that the second deflector device is in the non-operating position.

In one embodiment, a miter saw includes a horizontally-extending table, a saw assembly coupled to the horizontally-extending table, wherein the saw assembly includes a rotatable cutting blade, a motor coupled to the rotatable cutting blade for driving the rotatable cutting blade, and a fixed blade guard covering an upper portion of the rotatable cutting blade including at least a front end region of the rotatable cutting blade. The miter saw further includes an air deflector assembly positioned at least partially within the fixed blade guard and in proximity to the front end region of the rotatable cutting blade. The air deflector assembly has a first deflector device extending between a position substantially adjacent to a first inner side of the fixed blade guard, and a position substantially adjacent to, but spaced apart from, a first side of the rotatable cutting blade, and a second deflector device extending between a location substantially adjacent to a second inner side of the fixed blade guard, and a position substantially adjacent to, but spaced apart from, a second side of the rotatable cutting blade. The air deflector assembly may further include a portion extending in front of an outer edge of the rotatable cutting blade. In another embodiment, the second deflector device is movable between an operating position wherein it is positioned substantially adjacent to, but spaced apart from, the second side of the rotatable cutting blade, and a non-operating position wherein it is spaced apart from the rotatable cutting blade by a distance greater than in the operating position.

In one embodiment, a saw includes a base, a rotatable cutting blade coupled to the base and having a first side, a second side, an outer edge and a front end region, and a fixed blade guard coupled to the base and having a substantially fixed position relative to the rotatable cutting blade. The fixed blade guard covers at least a portion of the rotatable cutting blade. The saw further includes an air deflector assembly positioned in proximity to the front end region of the rotatable cutting blade and extending inwardly from first and second inner sides of the fixed blade guard to a position substantially adjacent to, but spaced apart from, the first and second sides of the rotatable cutting blade, respectively.

In one embodiment, the air deflector assembly further includes a portion substantially adjacent to, but spaced apart from, the outer edge of the rotatable cutting blade. It may also be movable to a non-operating position, wherein it is not substantially adjacent to at least one of the first and second sides of the rotatable cutting blade. In one embodiment, the cutting blade may be removed and/or replaced when the air deflector assembly is in the non-operating position.

The air deflector assembly may be coupled to the fixed blade guard, and may further include a first deflector device and a second deflector device, wherein the first deflector device is positioned substantially adjacent to, but spaced apart from, the first side of the rotatable cutting blade, and a second deflector device is positionable substantially adjacent to, but spaced apart from, the second side of the rotatable cutting blade. The second deflector device may further include a cantilevered main body portion that is biased to move away from the second side of the rotatable cutting blade.

In yet another embodiment, the saw further includes a pivot plate secured to the fixed blade guard and having an underside engagable with the cantilevered main body portion of the second deflector device. The pivot plate is movable between a first position wherein it exerts a first force on the cantilevered main body portion to thereby urge the second deflector device to the position substantially adjacent to, but spaced apart from, the second side of the rotatable cutting blade, and a second position wherein it exerts less force on the cantilevered main body portion to thereby enable it to move away from the position substantially adjacent to, but spaced apart from, the second side of the rotatable cutting blade.

These and other preferred embodiments of the present invention will be described in more detail below.

BRIEF DESCRIPTION OF THE DRAWINGS

So the manner in which the above recited features of the present invention can be understood in detail, a more particular description of embodiments of the present invention may be had by reference to the appended drawings. It is to be noted, however, that the appended drawings illustrate only typical embodiments encompassed within the scope of the present invention, and, therefore, are not to be considered limiting, for the present invention may admit to other equally effective embodiments.

FIG. 3 shows a bottom view of a miter saw having a rotatable cutting blade and a fixed blade guard with an air deflector assembly in an operating position, in accordance with one embodiment of the present invention.

DETAILED DESCRIPTION

Figure 1:
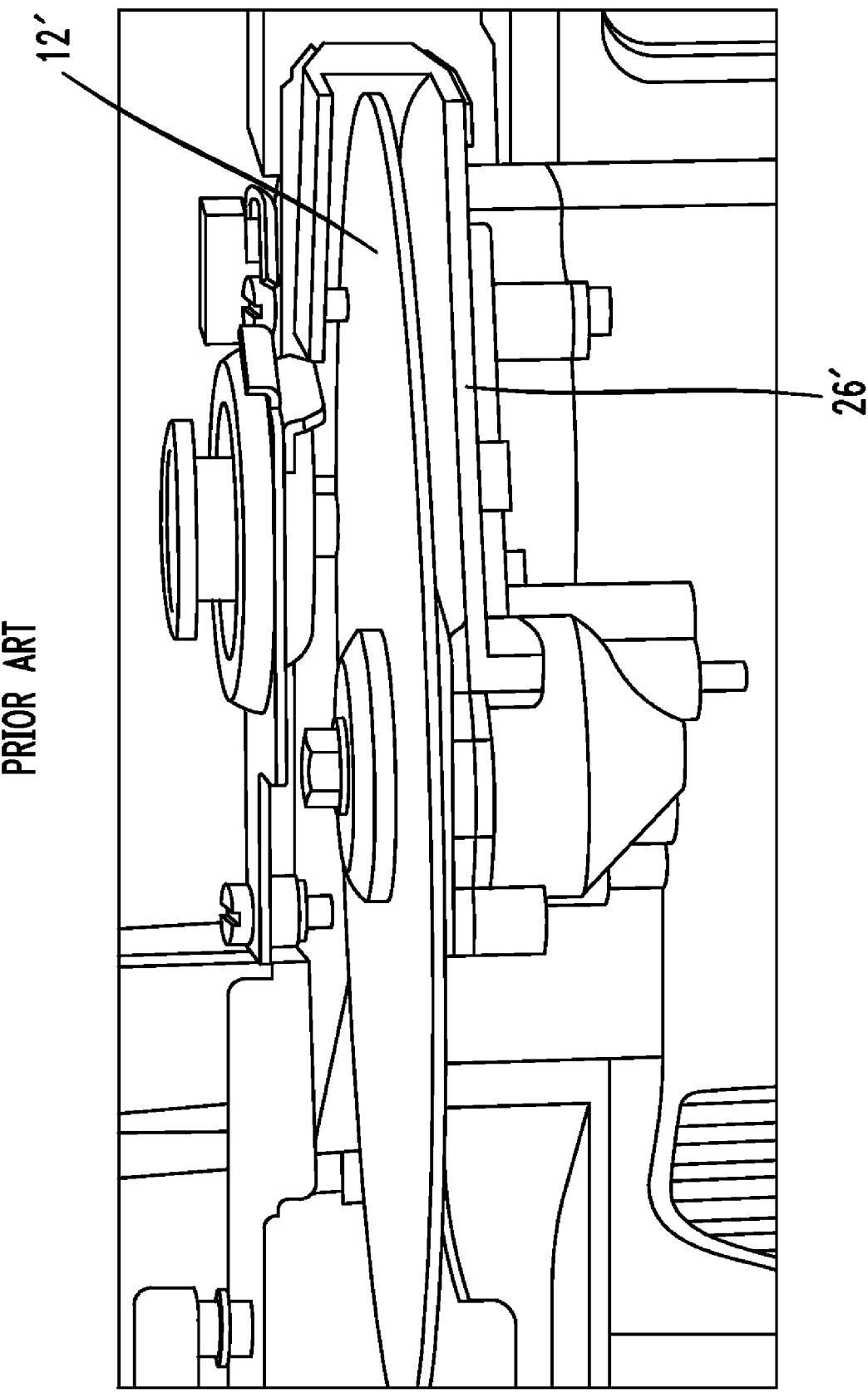
FIG. 1 shows a prior art miter saw having a rotatable cutting blade and a blade guard.

The headings used herein are for organizational purposes only and are not intended to limit the scope of the description or the claims. As used throughout this application, the word "may" is used in the permissive sense (i.e., meaning having the potential to) rather than the mandatory sense (i.e., meaning must). Similarly, the words "include", "including", and "includes" mean including but not limited to. To facilitate understanding, like reference numerals have been used, where possible, to designate like elements common to the figures. For purposes of clarity and in order to describe one or more embodiments of the present invention, terms such as "vertical", "horizontal", "front" and the like have been used herein. Such terms are merely used to provide a frame of reference for the embodiments shown in the drawings and are not intended to limit the scope of the present invention.

Figure 2A:
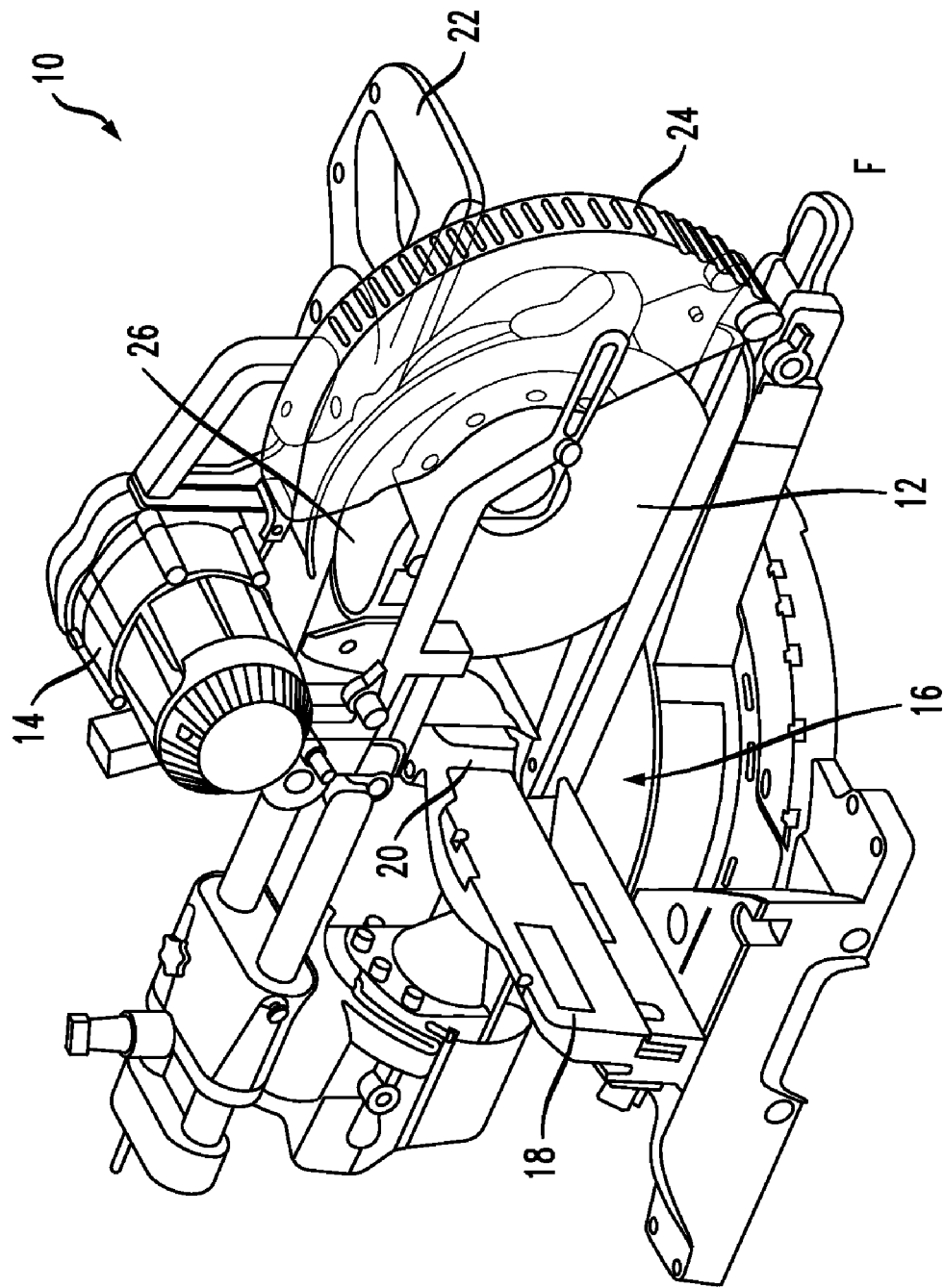
FIG. 2A shows a perspective view of a miter saw, in accordance with one embodiment of the present invention.

Referring to FIG. 2A, in one embodiment of the present invention, a miter saw 10 has a rotatable cutting blade 12, a motor 14 for driving the cutting blade, a horizontally-extending table 16, and a vertically extending fence 18 that cooperates with the table 16 to support work pieces (not shown) during cutting operations. The horizontally-extending table 16 provides a horizontal support surface for the work pieces, and the fence 18 provides a vertical support surface for the work pieces. The vertical fence is divided into two parts, with a gap 20 in-between the two parts through which the cutting blade 12 may pass.

During cutting operations, a user is typically positioned in front of the saw in a location indicated generally by reference "F" in FIG. 2A. The user engages handle 22 to move the saw blade 12 vertically up and down, and to move it back and forth horizontally. In order to protect the user from accidental injury from the rotating cutting blade 12, the miter saw includes both a movable blade guard 24 and a stationary or fixed blade guard 26. The fixed blade guard 26 remains fixed relative to the rotating blade and serves to cover an upper portion of the cutting blade as the blade is rotating. The movable blade guard 24 is typically pivotally coupled to the fixed blade guard, and is designed to pivot as the rotating blade descends toward the horizontally-extending table, yet still remain as a protective guard between the user and the blade.

Figure 2B:
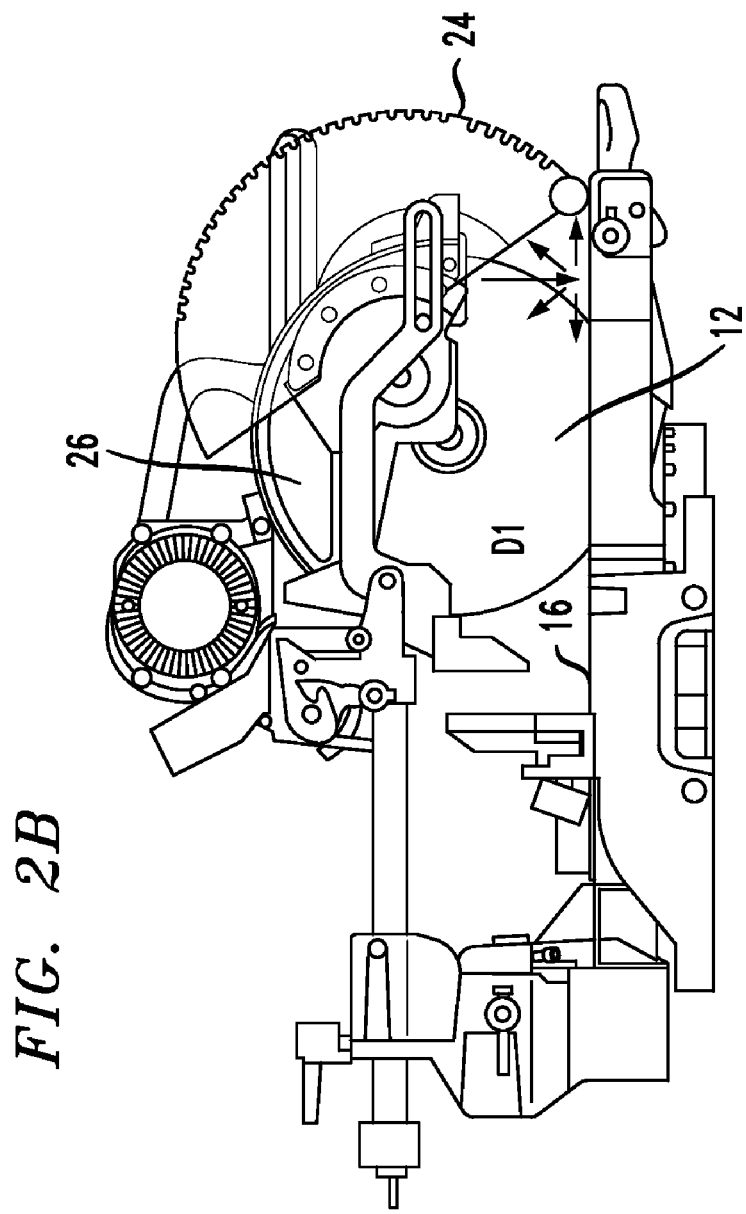
FIG. 2B is a side view of the miter saw of FIG. 2A.
Figure 4:
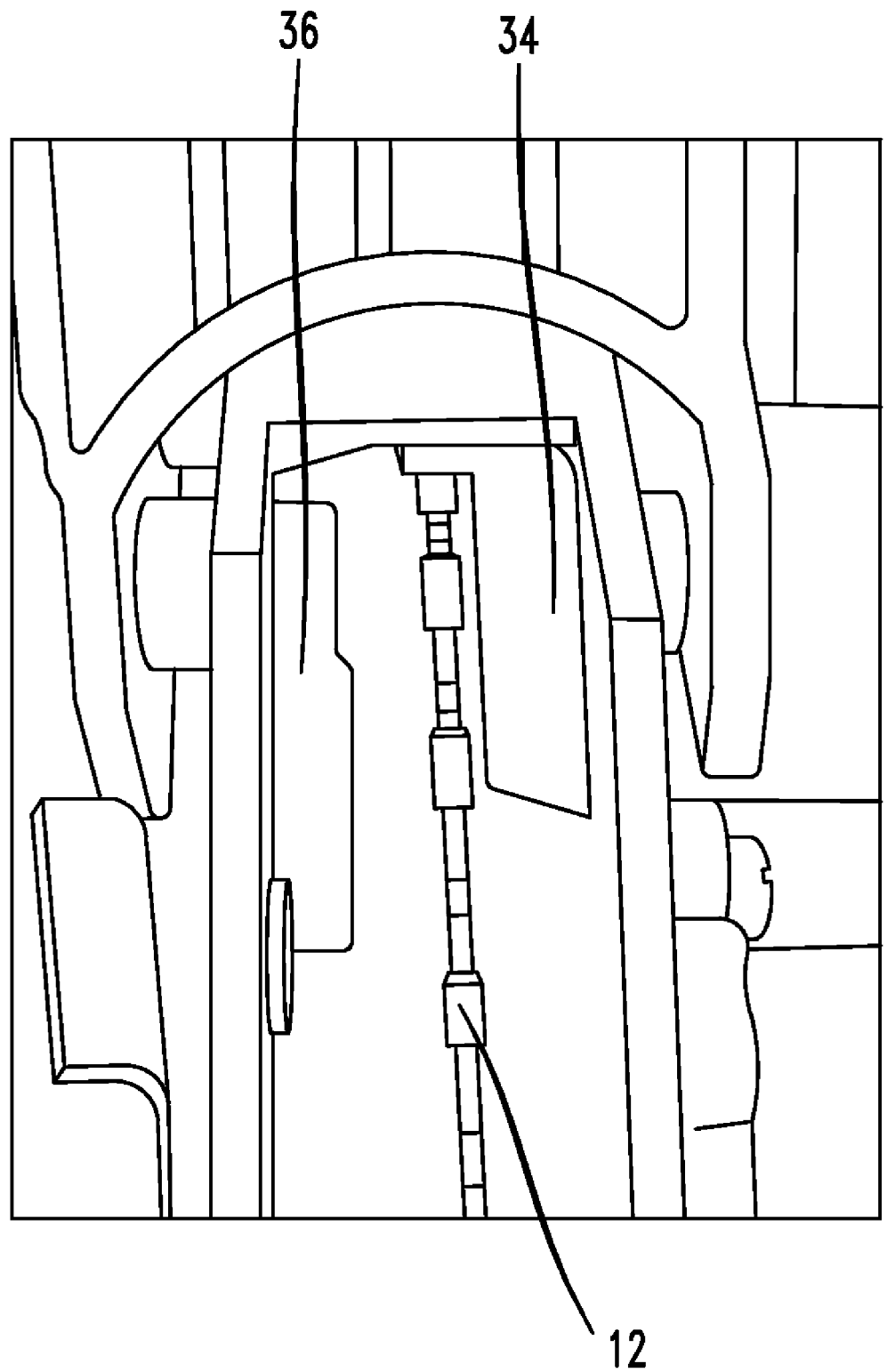
FIG. 4 shows the fixed blade guard and the air deflector assembly of FIG. 3 with the air deflector assembly in a non-operating position.

Referring to FIG. 2B, the cutting blade rotates clockwise or toward the front F of the miter saw, which is indicated by the direction of the arrow D1. In prior art devices, this clockwise rotation of the saw blade 12 generates air flow as illustrated generally by the arrows at the front end of the saw. This air flow tends to disperse saw dust that has accumulated on top of the table 16 and other surfaces, and directs some of this dust towards the user. Although the movable blade guard 24 in prior art devices shields the user somewhat, the air flow generated by the rotating blade 12 still causes significant dust dispersion. In addition, although the stationary guard 26 also shields portions of the rotating blade, prior art stationary blade guards do not prevent the illustrated air flow and have not otherwise been designed to alleviate this problem. As will be described in more detail below, in one or more embodiments, the present invention incorporates an air deflector assembly into the fixed blade guard 26 that limits scattering of the dust at the front of the miter saw.

FIGS. 3-7 illustrate a miter saw having an air deflector assembly positioned at a front end of the fixed blade guard to limit scattering of dust, in accordance with one embodiment of the present invention. The air deflector assembly disclosed herein may be used with any power saw known to those skilled in the art, or with any of the miter saws disclosed in the present application.

Referring to FIG. 3, in one embodiment, a power saw includes a rotatable cutting blade 12 positioned at least partially within a fixed blade guard 26, and an air deflector assembly 30 is positioned inside the fixed blade guard at the front end region 32 of the rotatable cutting blade. As used herein, the terminology "front end region" of the cutting blade refers to a forward portion of the cutting blade that is close to the user during cutting operations. The air deflector assembly 30 preferably includes a first deflector device 34 and a second deflector device 36. When the miter saw is ready for operation as illustrated in FIG. 3, the first deflector device 34 extends from a position substantially adjacent to a first inner side 37 of the fixed blade guard 26 to a position substantially adjacent to, but spaced apart from a first side 38 of the rotatable cutting blade. As used herein, the terminology "substantially adjacent to, but spaced apart from" means that the first deflector is positioned relatively close to the rotatable cutting blade, but spaced apart sufficiently so as not to interfere with rotation of the cutting blade. Similarly, the second deflector device extends from a position substantially adjacent to a second inner side 39 of the fixed blade guard 26 to a position substantially adjacent to, but spaced apart from the second side 40 of the rotatable cutting blade. As will be described in greater detail below, the second deflector device is movable between the "operating position" illustrated in FIG. 3, and a "non-operating" position illustrated in FIG. 4. In the latter "non-operating" position of FIG. 4, at least one of the first and second deflector devices 34, 36 has been moved away from the rotatable cutting blade 12 so that the rotatable cutting blade can be removed and/or changed by a user. In highly preferred embodiments, the first deflector device 34 remains stationary, and the second deflector device 36 is movable between the "operating position" and the "non-operating position." In the "non-operating" position, the second deflector device is further away from the second side 40 of the cutting blade than when the second deflector device is in the "operating position."

Figure 5A:
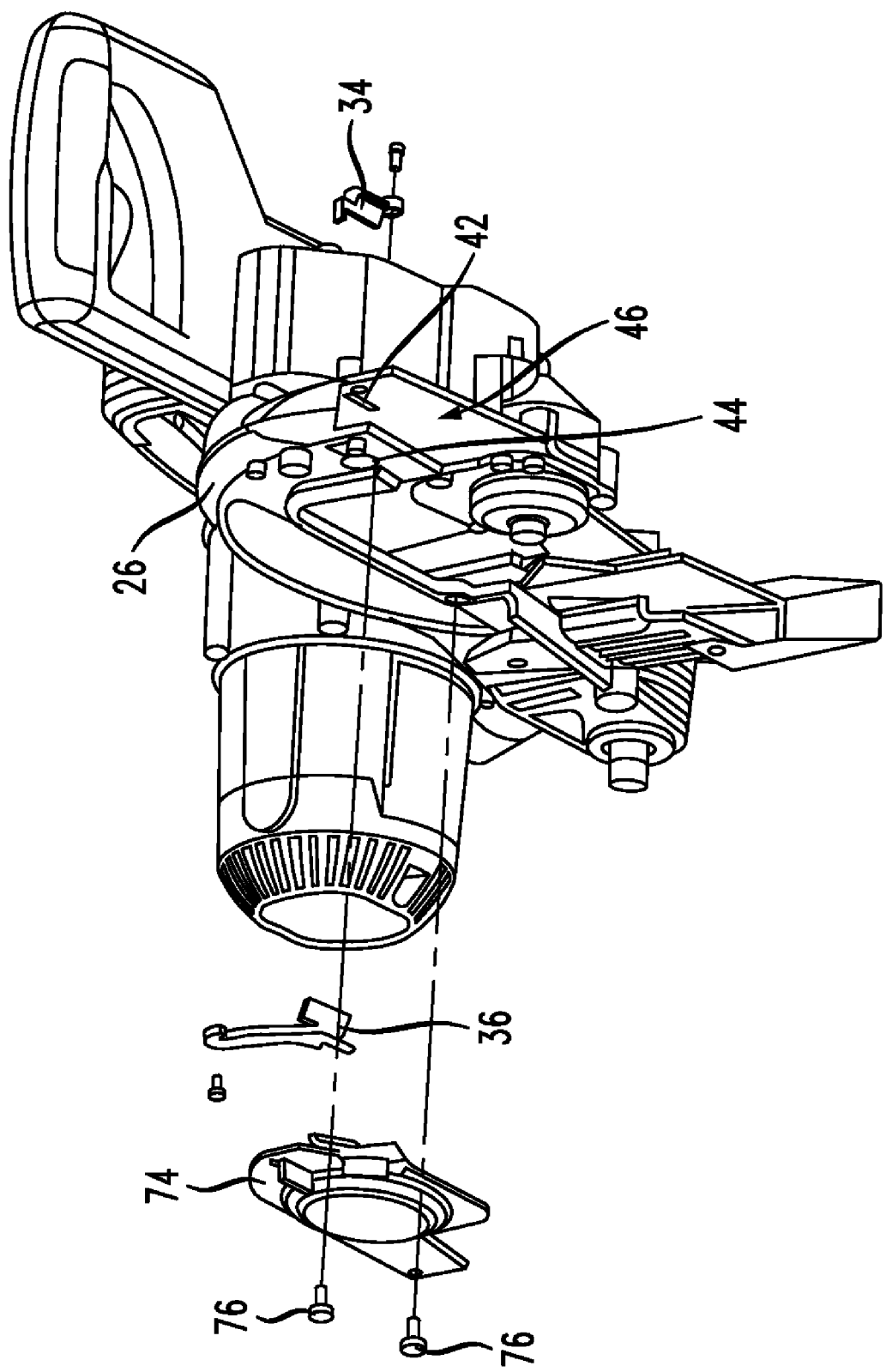
FIG. 5A shows an exploded view of a miter saw having an air deflector assembly, in accordance with one embodiment of the present invention.
Figure 5B:
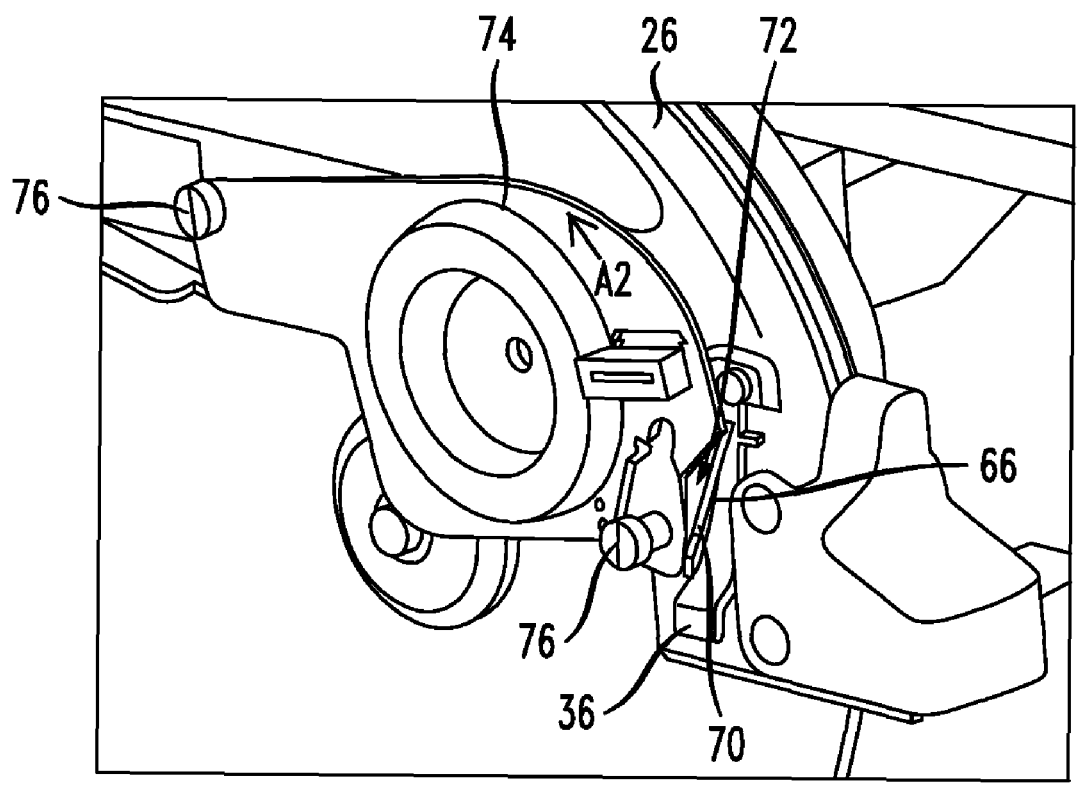
FIG. 5B shows a partially assembled view of a miter saw having an air deflector assembly, in accordance with one embodiment of the present invention.

FIGS. 5A-7 show a miter saw having an air deflector assembly for limiting scattering of dust, in accordance with one embodiment of the present invention. Referring to FIG. 5A, the first and second deflector devices 34, 36 are preferably coupled with opposite sides of the fixed blade guard 26. In the illustrated embodiment, both deflectors 34, 36 extend from an exterior of the fixed blade guard, through first and second apertures 42, 44 respectively in the fixed blade guard, and into an interior region 46 of the fixed blade guard. Referring to FIGS. 5A and 5B, after the second deflector device 36 has been coupled with the second aperture 44 on the fixed blade guard 26, a pivot plate 74 may be secured over the second deflector device 36 for moving the second deflector device into the "operating position." Fasteners 76 may be used for securing the pivot plate 74 over the second deflector device.

Figure 6:
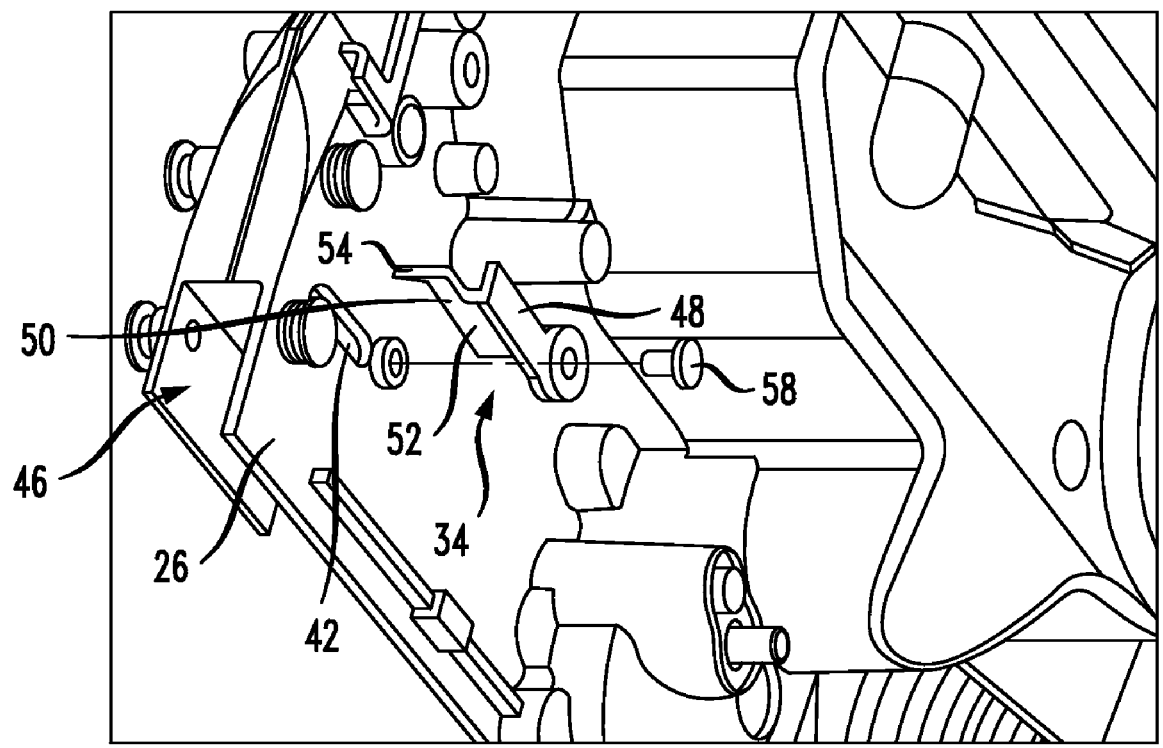
FIG. 6 shows a right side view of a section of the miter saw of FIG. 5A.

Referring to FIG. 6, the first deflector device 34 includes a main body portion 48, and an extension portion 50 that extends into the interior of the fixed blade guard 26, whereby the extension portion 50 serves to redirect air flow generated by the rotatable cutting blade (not shown). The extension portion preferably includes a lateral portion 52 that is positioned substantially adjacent to, but spaced apart from the first side of the rotatable cutting blade, and a front portion 54 that extends around the outer edge 56 of the cutting blade. The first deflector device 34 is desirably fixedly secured to the fixed blade guard 26 by an attaching element 58 such a bolt, screw or the like.

Figure 7:
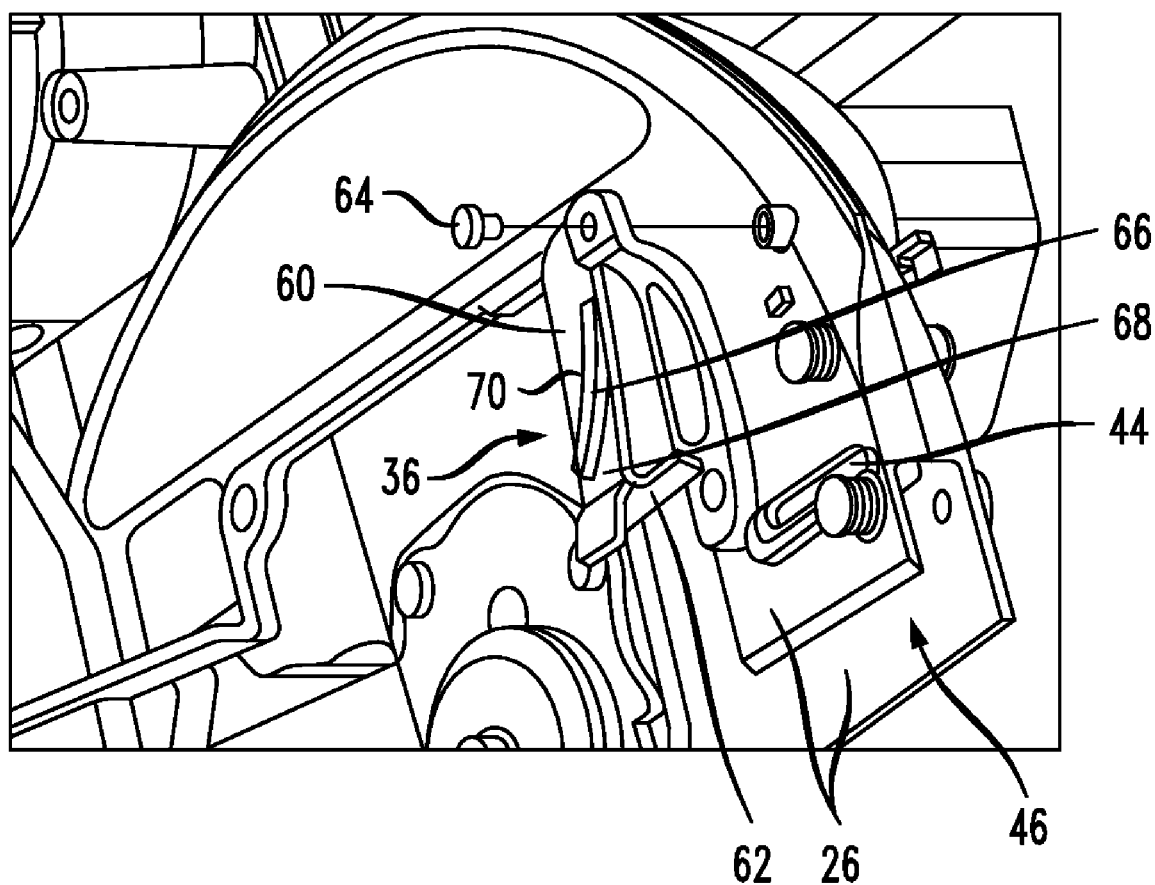
FIG. 7 is a left side view of a section of the miter saw of FIG. 5A.

FIG. 7 is an enlarged exploded view of the second deflector device 36. In a similar manner as the first deflector device, the second deflector device 36 extends from an exterior of the fixed blade guard 26, through a second aperture 44 and into the interior region 46 of the fixed blade guard. The second deflector device 36 preferably includes a cantilevered main body portion 60 and an extension portion 62 that extends from the main body portion into the interior region of the fixed blade guard. When the rotatable cutting blade (not shown) is in operation, the extension portion 62 of the second defector device 36 is preferably positioned substantially adjacent to but spaced apart from the second side of the rotatable cutting blade. As with the first deflector device, the second deflector device is secured to the fixed blade guard by a suitable attaching element 64 such as a bolt, screw or the like. One difference, however, is that the second deflector device 36 moves between an "operating position" as described above, and a "non-operating position" wherein it is sufficiently spaced apart from the cutting blade to allow for removal and/or changing of the blade. The illustrated embodiment accomplishes this by a combination of the cantilevered main body portion 60 which is biased away from the operating position, and a ramp-like projection 66 that extends outwardly from a top surface 68 of the main body portion of the second deflector device by an increasing amount along its length. The ramp-like projection 66 has an upper surface 70 that is configured to be engaged by a pivot plate.

Referring back to FIG. 5B, in one embodiment, the upper surface 70 of the projection 66 is designed to be engaged by a lower or inner surface 72 of a pivot plate 74 that is secured to the fixed blade guard 26 by screws 76 or the like. It is well known to have such a pivot plate that can be removed to allow access to and removal of the cutting blade. Upon loosening of the screws 76, the pivot plate 74 can be rotated slightly in the direction indicated by the arrow A2, lessening the force exerted on the projection 66 and the cantilevered main body portion of the second deflector device 36 and causing it to move away from the second side of the rotatable cutting blade to the "non-operating position" shown in FIG. 4. In the "non-operating position", the cutting blade is accessible and can be removed or changed if needed. After the cutting blade has been changed, the pivot plate 74 may be rotated back into place for engaging the second deflector device 36 and urging a portion of the second deflector device back inside the fixed blade guard 26.

Although the present invention is not limited by any particular theory of operation, it is believed that the air deflector assembly disclosed herein is advantageous in that it redirects air flow around the rotatable cutting blade so as to reduce dust dispersion and/or improve dust collection. As indicated previously, the concepts set forth herein and described in detail for a preferred embodiment may be carried out in various ways and applied to any suitable rotating power saw. As such, the scope of the present invention is to be limited only as set forth in the appended claims.

What is claimed is:

1. A saw comprising:
    a base;
    a saw assembly coupled to the base and including a rotatable cutting blade having a first side, a second side, an outer edge and a front end region, a motor for driving the rotatable cutting blade, and a fixed blade guard covering at least a portion of the rotatable cutting blade, the fixed blade guard being fixed in position relative to an axis of the rotatable cutting blade; and
    an air deflector assembly positioned in proximity to the front end region of the rotatable cutting blade, the air deflector assembly comprising a first deflector device positioned adjacent to, but spaced apart from, the first side of the rotatable cutting blade, and a second deflector device,
    wherein the first deflector device is fixedly coupled to the fixed blade guard, and wherein the second deflector device includes a cantilevered main body portion having an upper end fixed to the fixed blade guard and a free lower end that is pivotable relative to the fixed blade guard between an operating position in which the free lower end of the second deflector device is positioned adjacent to, but spaced apart from, the second side of the rotatable cutting blade, and a non-operating position in which the free lower end of the second deflector device is spaced apart from the second side of the rotatable cutting blade by a greater distance than in the operating position, said upper end of said second deflector remaining fixed to the fixed blade guard in said non-operating position.

2. The saw according to claim 1, wherein when in the operating position, the second deflector device extends between a location substantially adjacent to a second inner side of the fixed blade guard and the location substantially adjacent to, but spaced apart from, the second side of the rotatable cutting blade.

3. The saw according to claim 1, wherein the first deflector device extends between a location substantially adjacent to a first inner side of the fixed blade guard and a location substantially adjacent to, but spaced apart from, the first side of the rotatable cutting blade.

4. The saw according to claim 1, wherein the air deflector assembly is positioned at least partially within an interior of the fixed blade guard.

5. The saw according to claim 4, wherein the first deflector device further comprises a main body portion and an extension portion, wherein the extension portion extends from an exterior of the fixed blade guard to the interior of the fixed blade guard.

6. The saw according to claim 5, wherein the extension portion of the first deflector device extends through a first aperture in the fixed blade guard.

7. The saw according to claim 6, wherein the fixed blade guard includes a second aperture opposite the first aperture, and wherein the second deflector device further includes the cantilevered main body portion having the upper end fixed to the fixed blade guard and the free lower end including an extension portion extending from an exterior of the fixed blade guard into the interior of the fixed blade guard.

8. The saw according to claim 7, wherein the extension portion of the second deflector device extends through the second aperture in the fixed blade guard.

9. The saw according to claim 7, wherein the main body portion of the second deflector device includes a projection extending outwardly from the main body portion by an increasing amount between the fixed upper end and the free lower end.

10. The saw according to claim 9, further comprising a pivotable plate secured to the fixed blade guard and having an underside engagable with the projection extending outwardly from the main body portion of the second deflector device, wherein the pivotable plate is movable along the projection between a first position wherein the pivotable plate urges the second deflector device into the operating position, and a second position wherein the second deflector device is moveable into the non-operating position.

11. A miter saw comprising:
    a horizontally-extending table;
    a saw assembly coupled to the horizontally-extending table, the saw assembly including a rotatable cutting blade, a motor coupled to the rotatable cutting blade for driving the rotatable cutting blade, and a fixed blade guard covering an upper portion of the rotatable cutting blade including at least a front end region of the rotatable cutting blade, the fixed blade guard being fixed in position relative to an axis of the rotatable cutting blade; and
    an air deflector assembly positioned at least partially within the fixed blade guard and in proximity to the front end region of the rotatable cutting blade, the air deflector assembly including a first deflector device extending between a position adjacent to a first inner side of the fixed blade guard, and a position adjacent to, but spaced apart from, a first side of the rotatable cutting blade, and a second deflector device extending between a location adjacent to a second inner side of the fixed blade guard, and a position adjacent to, but spaced apart from, a second side of the rotatable cutting blade, wherein the second deflector device includes a cantilevered main body portion having an upper end fixed to the fixed blade guard and a free lower end that is pivotable relative to the fixed blade guard between an operating position in which it is positioned adjacent to, but spaced apart from, the second side of the rotatable cutting blade, and a non-operating position in which it is spaced apart from the second side of the rotatable cutting blade by a distance greater than in the operating position, said upper end of said second deflector remaining fixed to the fixed blade guard in said non-operating position.

12. The saw according to claim 11, wherein the air deflector assembly further includes a portion extending in front of an outer edge of the rotatable cutting blade.

13. A saw comprising:
    a base;
    a rotatable cutting blade rotatably coupled to the base and having a first side, a second side, an outer edge and a front end region;

a fixed blade guard coupled to the base and having a substantially fixed position relative to the rotatable cutting blade, the fixed blade guard covering at least a portion of the rotatable cutting blade;

an air deflector assembly positioned in proximity to the front end region of the rotatable cutting blade and extending inwardly from first and second inner sides of the fixed blade guard to a position substantially adjacent to, but spaced apart from, the first and second sides of the rotatable cutting blade respectively, wherein the air deflector assembly comprises a first deflector device and a second deflector device, wherein the first deflector device is positioned substantially adjacent to, but spaced apart from, the first side of the rotatable cutting blade, and a second deflector device is positionable substantially adjacent to, but spaced apart from, the second side of the rotatable cutting blade, wherein the second deflector device further includes a cantilevered main body portion that is moveable away from the second side of the rotatable cutting blade; and a pivotable plate secured to the fixed blade guard and having an underside engagable with the cantilevered main body portion of the second deflector device, wherein the pivotable plate is movable between a first position in which it exerts a first force on the cantilevered main body portion to thereby urge the second deflector device to the position substantially adjacent to, but spaced apart from, the second side of the rotatable cutting blade, and a second position wherein it exerts less force on the cantilevered main body portion to thereby enable the second deflector device to be moveable away from the position substantially adjacent to, but spaced apart from, the second side of the rotatable cutting blade.

14. The saw according to claim 13, wherein the air deflector assembly further includes a portion extending in front of the outer edge of the rotatable cutting blade.

15. The saw according to claim 14, wherein the cantilevered main body portion of the second deflector device of the has an upper end secured to the fixed blade guard and a free lower end that is movable to a non-operating position in which the lower free end is not substantially adjacent to the second side of the rotatable cutting blade.

16. The saw according to claim 15, wherein the fixed blade guard has an aperture and the free lower end of the cantilevered main body portion is extendible through the aperture.

* * * * *